United States Patent
Ohdoi et al.

(10) Patent No.: US 9,592,723 B2
(45) Date of Patent: Mar. 14, 2017

(54) VEHICLE SUNROOF DEVICE

(71) Applicant: Webasto SE, Stockdorf (DE)

(72) Inventors: Kozo Ohdoi, Higashi-Hiroshima (JP); Akihiro Shinkawa, Higashi-Hiroshima (JP)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 14/909,765

(22) PCT Filed: Sep. 16, 2014

(86) PCT No.: PCT/EP2014/069686
§ 371 (c)(1),
(2) Date: Feb. 3, 2016

(87) PCT Pub. No.: WO2015/040018
PCT Pub. Date: Mar. 26, 2015

(65) Prior Publication Data
US 2016/0185196 A1 Jun. 30, 2016

(30) Foreign Application Priority Data
Sep. 19, 2013 (JP) .................................. 2013-194476

(51) Int. Cl.
*B60J 7/05* (2006.01)
*B60J 7/16* (2006.01)
*B60J 7/02* (2006.01)

(52) U.S. Cl.
CPC .............. *B60J 7/1642* (2013.01); *B60J 7/02* (2013.01); *B60J 7/022* (2013.01); *B60J 7/05* (2013.01)

(58) Field of Classification Search
CPC ..................................... B60J 7/05; B60J 7/02
USPC .................................................. 296/221, 223
See application file for complete search history.

(56) References Cited

U.S. PATENT DOCUMENTS

| 6,257,658 | B1 * | 7/2001 | Nabuurs | B60J 7/022 |
| | | | | 296/223 |
| 6,325,453 | B1 * | 12/2001 | Manders | B60J 7/022 |
| | | | | 296/223 |
| 6,419,310 | B1 * | 7/2002 | Manders | B60J 7/05 |
| | | | | 296/221 |
| 2009/0134671 | A1 | 5/2009 | Hager et al. | |

FOREIGN PATENT DOCUMENTS

| DE | 102005032437 A1 | 1/2007 |
| EP | 1046528 A1 | 10/2000 |
| EP | 1084881 A1 | 3/2001 |
| JP | 2006-27493 A | 2/2006 |

* cited by examiner

*Primary Examiner* — Dennis H Pedder
(74) *Attorney, Agent, or Firm* — Fitch, Even, Tabin & Flannery, LLP

(57) ABSTRACT

A vehicle sunroof device in which a movable panel is supported by a panel support member and the movable panel is capable of being moved in a tilted manner, the movable panel is prevented from being detached due to an upward load without increasing the thickness and the weight of the cored bar of the panel support member in a low-cost structure. A portion of the cored bar of the panel support member, which is located under cam grooves is bent to form first and second protrusions which protrude laterally in the thickness direction of the cored bar. The first protrusion is formed by notching multiple parts of the cored bar and bending the notched parts.

4 Claims, 14 Drawing Sheets

VEHICLE SUNROOF DEVICE

CROSS-REFERENCE TO RELATED APPLICATIONS

This application is a U.S. national phase application filed under 35 U.S.C. §371 of International Application No. PCT/EP2014/069686, filed Sep. 16, 2014, designating the United States, which claims priority from Japanese Patent Application No. 2013-194476, filed Sep. 19, 2013, which are hereby incorporated herein by reference in their entirety for all purposes.

TECHNICAL FIELD

The present invention relates to sunroof devices including a movable panel for opening and closing an opening formed in a fixed roof of a vehicle.

BACKGROUND ART

Sunroof devices of a vehicle which include a panel support member fixed to a lower surface of a movable panel, and a slider that is cam-coupled to the panel support member, and in which the movable panel is opened and closed by tilting or sliding the panel support member by sliding the slider along a guide rail fixed to the fixed roof, have been known.

In the sunroof device of this type, the panel support member may be comprised of an elongated panel-like cored bar, and a resin portion integrally formed on a surface of the cored bar (see, e.g., Patent Document 1). The resin portion covers both side surfaces of the cored bar, and includes cam grooves on both sides in the thickness direction of the cored bar. A cam follower provided at the slider is slidably engaged with each of the cam grooves. When the slider moves along the guide rail, the cam follower provided at the slider moves in the cam groove of the panel support member to cause the movable panel to move in a tilted manner or slide.

Patent Document 2 discloses that a panel support member is comprised of two elongated panel-like cored bars overlapped each other, and a resin portion covering a bottom end of each of the cored bars. The bottom end of each of the cored bars is bent outward in the thickness direction of the cored bar, and forms a flange. The resin portion forms a cam plate portion covering a surface of the flange and having a predetermined curved shape. The cam plate portion is coupled to the slider, with a connecting block interposed therebetween. An engagement groove that slidably engages with the cam plate portion is formed in the connecting block.

CITATION LIST

Patent Document

[Patent Document 1] Japanese Unexamined Patent Publication No. 2006-27493
[Patent Document 2] Japanese Unexamined Patent Publication No. 2000-313235

SUMMARY OF THE INVENTION

Technical Problem

However, the sunroof device disclosed in Patent Document 1 has a problem that in the case where an excess upthrust load caused by a traveling wind or by a load applied from a person is applied to the movable panel in a tilted state, the resin portion of the panel support member which is relatively weak in strength may be damaged and the panel support member may by detached from the engagement portion of the slider in an upward direction. Thus, there is scope for improvement in terms of preventing the detachment of the movable panel.

One of measures to solve the problem may be applying a panel support structure of Patent Document 2 to the sunroof device of Patent Document 1, and using two cored bars and bending a bottom end of each of the cored bars outward in the thickness direction of the cored bar to form a pair of flanges. In this structure, even when the panel support member is caused to move upward, the pair of flanges formed at the cored bars are caught at the engagement portion of the slider. It is therefore possible to prevent the panel support member from being detached from the slider. In this case, however, although it is possible to prevent the detachment of the movable panel, there is another problem that the cost is increased and the thickness and the weight of the panel support member are increased because two cored bars are necessary, compared to the case where a single cored bar is used.

The present invention was made in view of the above problems, and it is an objective of the invention to improve a structure of a sunroof device of a vehicle, and reliably prevent the detachment of a movable panel due to an upthrust load without an increase in thickness and weight of a cored bar of a panel support member, using a low-cost structure.

Solution to the Problem

The first aspect of the present invention is directed to a sunroof device, including: a movable panel for opening and closing an opening which is formed in a fixed roof of a vehicle and has a predetermined width; a pair of guide rails fixed to the fixed roof and extending along side edges of the opening in a direction of the width; a pair of sliders each of which is connected to a corresponding one of the pair of guide rails and is slidable on the guide rail; and a pair of panel support members each having engagement cams which engage with an engagement portion provided to a corresponding one of the sliders, and each being fixed to a lower surface of the movable panel, wherein the movable panel is capable of being moved in a tilted manner via the panel support members by allowing the sliders to move along the guide rails.

Further, each of the panel support members includes an elongated panel-like cored bar which extends along the lower surface of the movable panel in a direction along which the guide rails extend, and a resin portion integrally formed with the cored bar and having the engagement cams on both lateral sides of the cored bar in a thickness direction of the cored bar; a portion of the cored bar which is located under the engagement cams is bent to form first and second protrusions which protrude toward the lateral sides of the cored bar in the thickness direction of the cored bar; and at least one of the first and second protrusions is formed by notching part of the cored bar into a tongue and bending the notched part.

In the first aspect of the present invention, even when an excess upthrust load caused by a traveling wind or by a load applied from a person is applied to the movable panel in the tilted state, and the resin portion of the panel support member is damaged and the panel support member is caused to move upward, the first and second protrusions provided at the cored bar of the panel support member are caught at the engagement portion of the slider, thereby making it possible to prevent the panel support member from being detached from the engagement portion of the slider in an upward direction. As a result, it is possible to reliably prevent the detachment of the movable panel.

Further, at least one of the first and second protrusions is formed by notching parts of the cored bar into tongues and bending the notched parts. Thus, it is not necessary to combine two cored bars, and the protrusions can be easily formed at both sides of a single cored bar in the thickness direction thereof. As a result, the thickness and the weight of the panel support member can be reduced, thereby making it possible to reliably prevent the detachment of the movable panel, using a low-cost structure.

The second aspect of the present invention is that in the first aspect of the present invention, the first protrusion includes a plurality of tongues formed by notching multiple parts of the cored bar and bending the notched parts, and the tongues are aligned and spaced from one another in the direction along which the cored bar extends, and the second protrusion is formed into a continuous panel-like shape extending in the direction along which the cored bar extends, by bending a bottom end of the cored bar into an L shape.

In the second aspect of the present invention, only one of the first and second protrusions (i.e., the first protrusion) is comprised of a plurality of tongues, and the other (i.e., the second protrusion) is formed into a continuous panel-like shape extending in the direction along which the cored bar extends. Thus, compared to the case where each of the first and second protrusions is comprised of a plurality of tongues, the number of notches necessary to form the tongues can be reduced. As a result, the protrusions can be easily formed at both sides of the cored bar in its thickness direction, while sufficiently ensuring the stiffness (the strength) of the cored bar.

The third aspect of the present invention is that in the first aspect of the present invention, each of the first and second protrusions includes a plurality of tongues formed by notching multiple parts of the cored bar and bending the notched parts, and the tongues are aligned and spaced from one another in the direction along which the cored bar extends.

In the third aspect of the present invention, each of the first and second protrusions is comprised of a plurality of tongues formed by notching multiple parts of the cored bar. As a result, the protrusions can be easily formed at both sides of the cored bar in its thickness direction, while reducing the amount of use of the cored bar as much as possible.

The fourth aspect of the present invention is that in the third aspect of the present invention, the tongues of the first protrusion and the tongues of the second protrusion are arranged alternately in a staggered manner in the direction along which the cored bar extends.

In the fourth aspect of the present invention, the first protrusions and the second protrusions can be formed equally and closely on both sides of the cored bar. Thus, when the resin portion of the panel support member is damaged and the cored bar is caused to move upward, the protrusions on both sides of the cored bar can be easily caught at the engagement portion of the slider. As a result, it is possible to prevent the panel support member from being detached from the engagement portion of the slider in an upward direction with more reliability.

Advantages of the Invention

As described above, the sunroof device of the present invention is configured such that a portion of the cored bar of the panel support member which is located under the engagement cams is bent to form first and second protrusions which protrude toward the lateral sides of the cored bar in the thickness direction of the cored bar, and at least one of the first and second protrusions is formed by notching parts of the cored bar into tongues and bending the notched parts. It is therefore possible to reliably prevent the detachment of the movable panel due to an upthrust load, without an increase in the thickness and weight of the cored bar of the panel support member, using a low-cost structure.

DETAILED DESCRIPTION

Embodiments will be described in detail below based on the drawings.

First Embodiment

Figure 1:
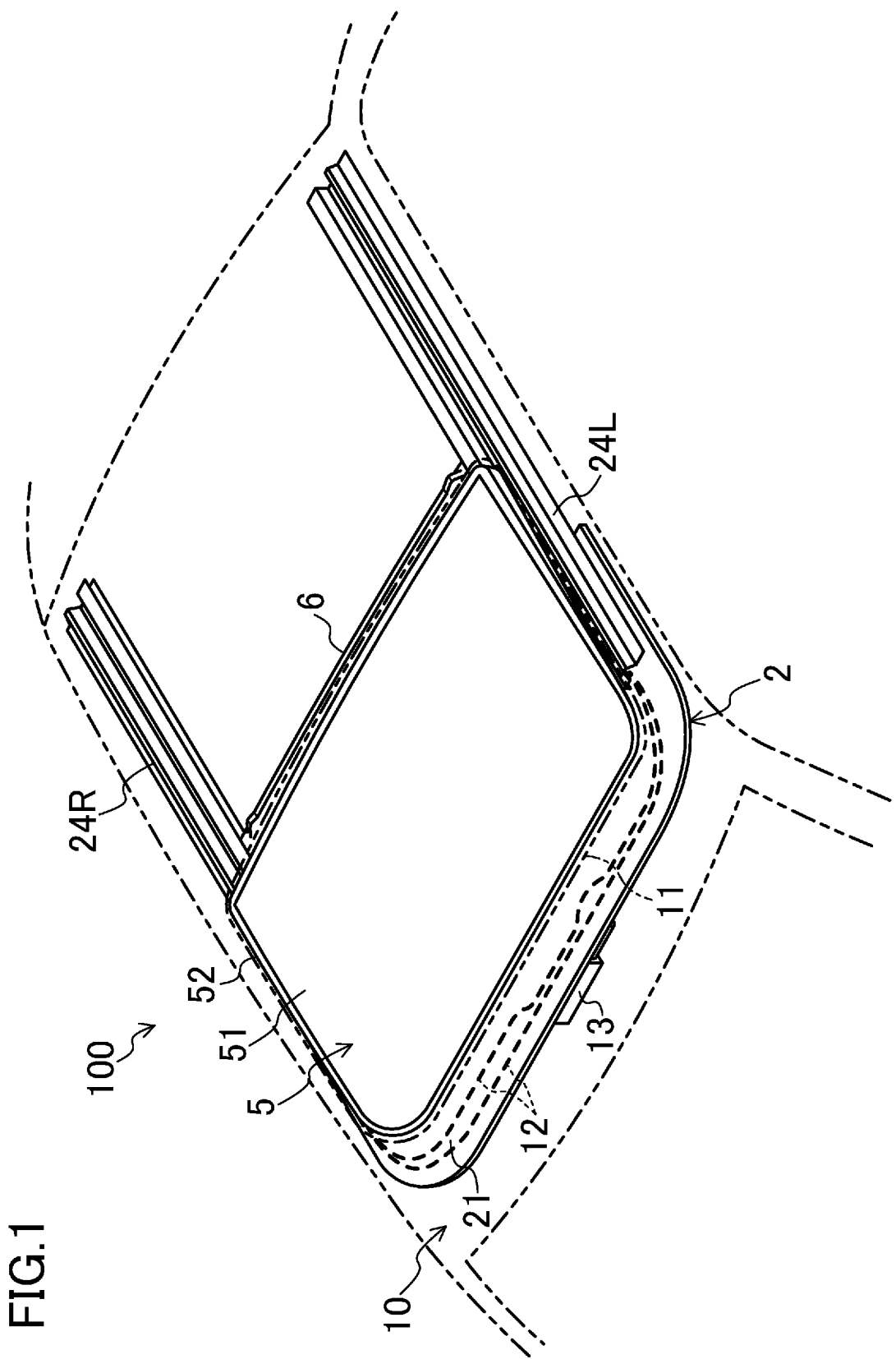
FIG. 1 is an oblique view of a sunroof device in a fully-closed state.
Figure 2:
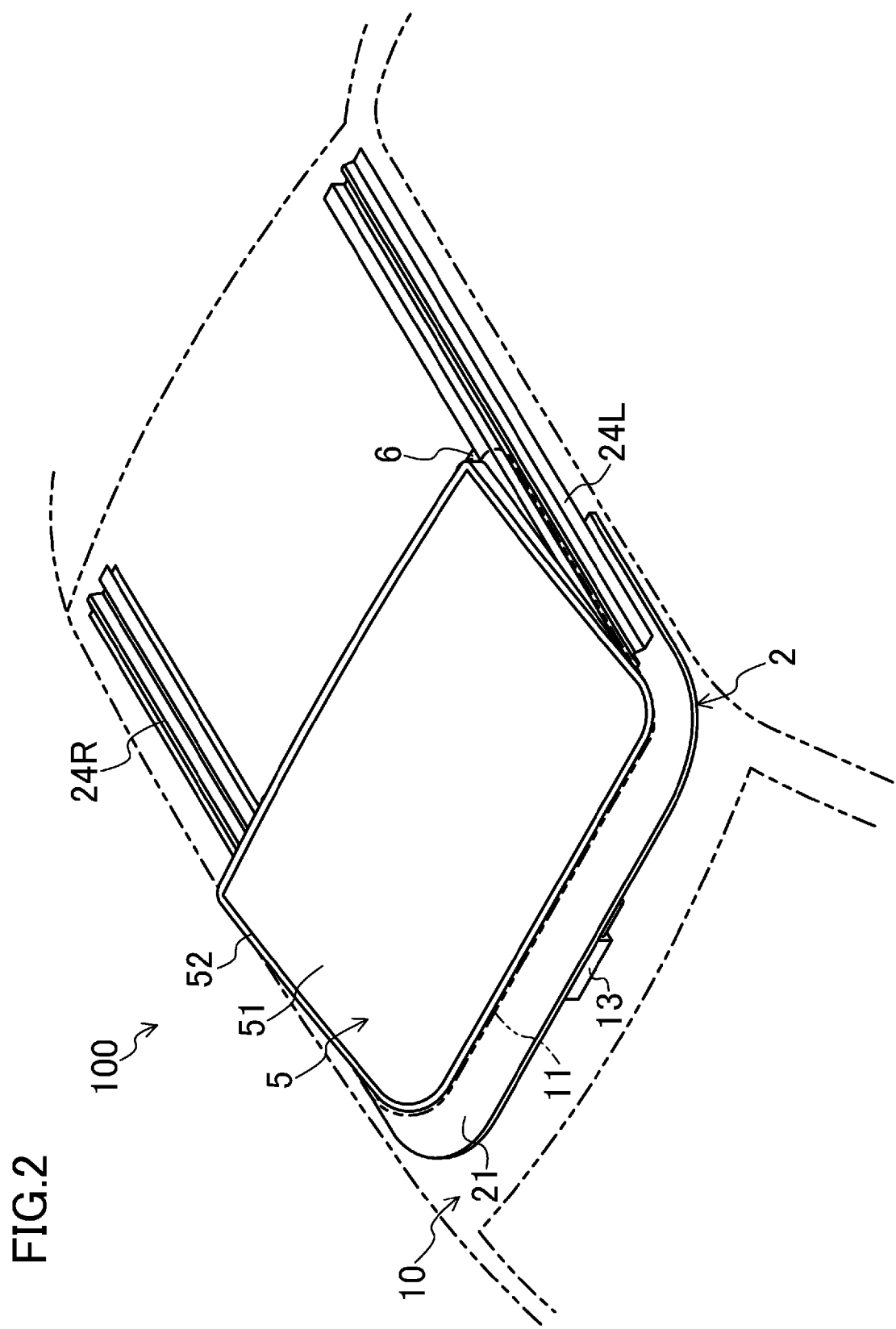
FIG. 2 is an oblique view of the sunroof device in a tilted state.
Figure 3:
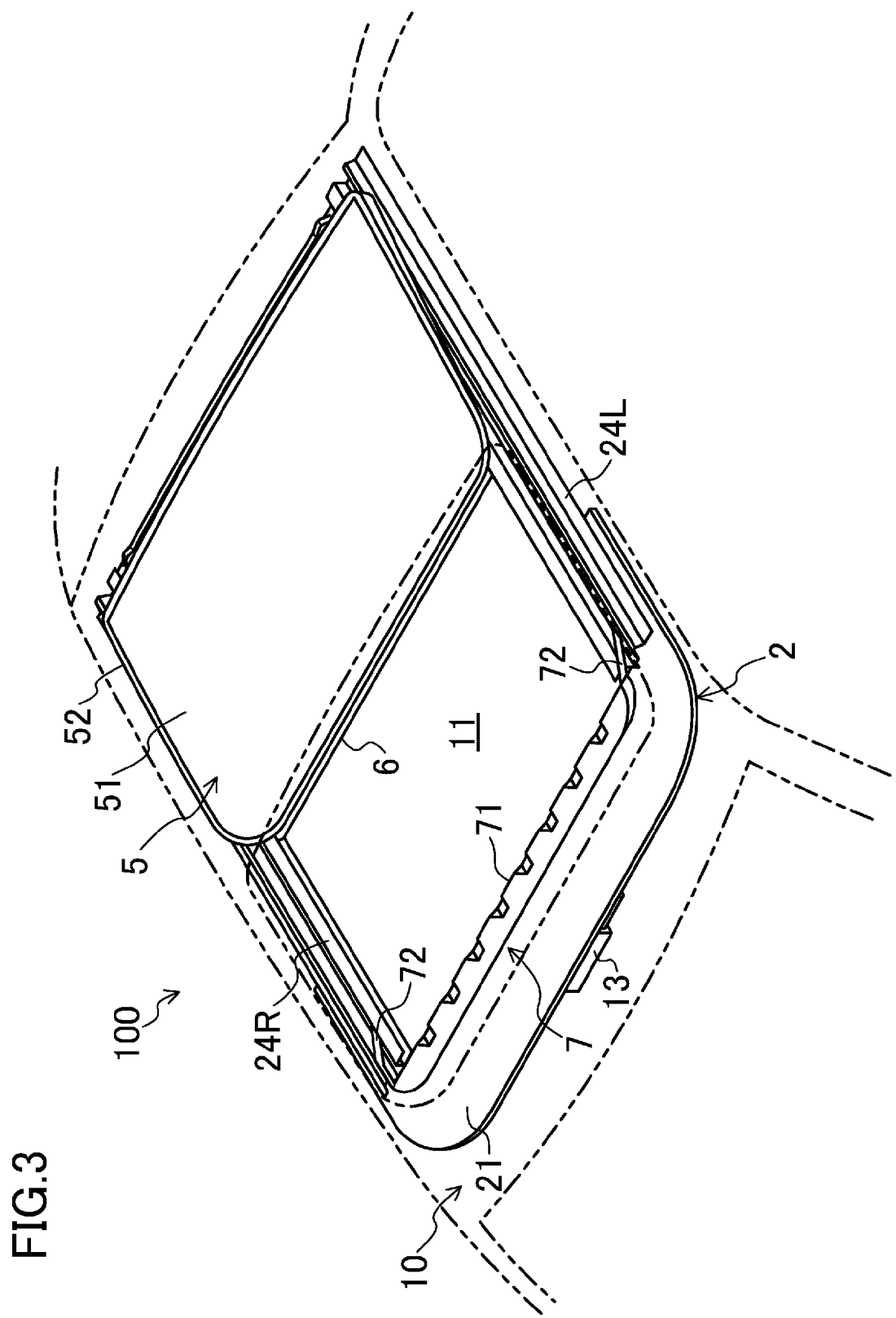
FIG. 3 is an oblique view of the sunroof device in a fully-opened state.

FIGS. 1-3 show oblique views of a sunroof device 100. In the present specification, for convenience of description, the front side of a vehicle in its front-and-rear direction is called "front," and the rear side is called "rear." The left side of a vehicle in its width direction is called "left," and the right side is called "right."

The sunroof device 100 is mounted at an opening 11 formed in a roof 10 of a vehicle. The sunroof device 100 includes a frame 2 placed around the periphery of the opening 11, a movable panel 5 movably attached to the frame 2, a shade 6 located under the movable panel 5, a deflector 7 (shown in only FIG. 3) provided at a front end of the frame 2, and an open/close mechanism 8 (see FIG. 4) which opens/closes the movable panel 5.

The movable panel 5 is driven by the open/close mechanism 8, and can be in a fully-closed state shown in FIG. 1, a tilted state shown in FIG. 2, and an open state shown in FIG. 3. In the fully-closed state, the periphery of the movable panel 5 is in close contact with the periphery of the opening 11 to seal the opening 11. In the tilted state, the movable panel 5 is tilted such that a rear end edge of the movable panel 5 is lifted from the periphery of the opening 11, creating a gap for ventilation between the rear end edge of the movable panel 5 and the periphery of the opening 11. In the open state, the rear end of the movable panel 5 moves downward from the position in its fully-closed state, and is drawn into a space under the roof 10. In the fully-opened state in which the movable panel 5 is most widely open, the movable panel 5 and the roof 10 mostly overlap each other, and the opening 11 is uncovered.

The frame 2 includes a front frame 21 extending approximately in a vehicle width direction, and left and right guide rails 24L, 24R extending in a front-and-rear direction. A drive motor 13 which drives a push-pull cable 12 (shown in only FIG. 1) is attached to the front frame 21. The left guide rail 24L and the right guide rail 24R have symmetrical structures. The push-pull cable 12 is laid at the front frame 21, the left guide rail 24L, and the right guide rail 24R. The open/close mechanism 8 (not shown in FIGS. 1-3) is provided at each of the left and right guide rails 24L, 24R. The left and right guide rails 24L, 24R may be simply referred to as a "guide rail 24" when left and right are not differentiated.

The movable panel 5 includes an approximately square glass panel 51, and a weather strip 52 provided at the periphery of the glass panel 51.

The shade 6 is like a board which is approximately the same size as the movable panel 5. The shade 6 is guided by the left and right guide rails 24L, 24R.

As shown in FIG. 3, the deflector 7 includes a body 71 extending in the vehicle width direction, and connecting portions 72, 72 extending toward the rear side from both ends of the body 71 in the vehicle width direction. The body 71 extends in the vehicle width direction from the left guide rail 24L to the right guide rail 24R. That is, the length of the body 71 in the vehicle width direction is approximately the same as the length of the front frame 21 in the vehicle width direction. A rear end of the connecting portion 72 is rotatably connected to a front end of the guide rail 24. The connecting portion 72 is energized to cause the body 71 to be lifted from the front frame 21. On the other hand, the front frame 21 is provided with a recessed groove (not shown) in which the body 71 is housed when the connecting portion 72 is pushed down. Thus, in the fully-closed state and the tilted state of the movable panel 5, the deflector 7 is pushed down by the front part of the movable panel 5, and is housed in the recessed groove (not shown) formed in the front frame 21. In this state, the deflector 7 is hidden between the movable panel 5 and the front frame 21 as shown in FIGS. 1 and 2, and not exposed to the outside. On the other hand, in the open state of the movable panel 5, the deflector 7 is exposed to the outside as shown in FIG. 3, and is lifted from the front frame 21.

Figure 4:
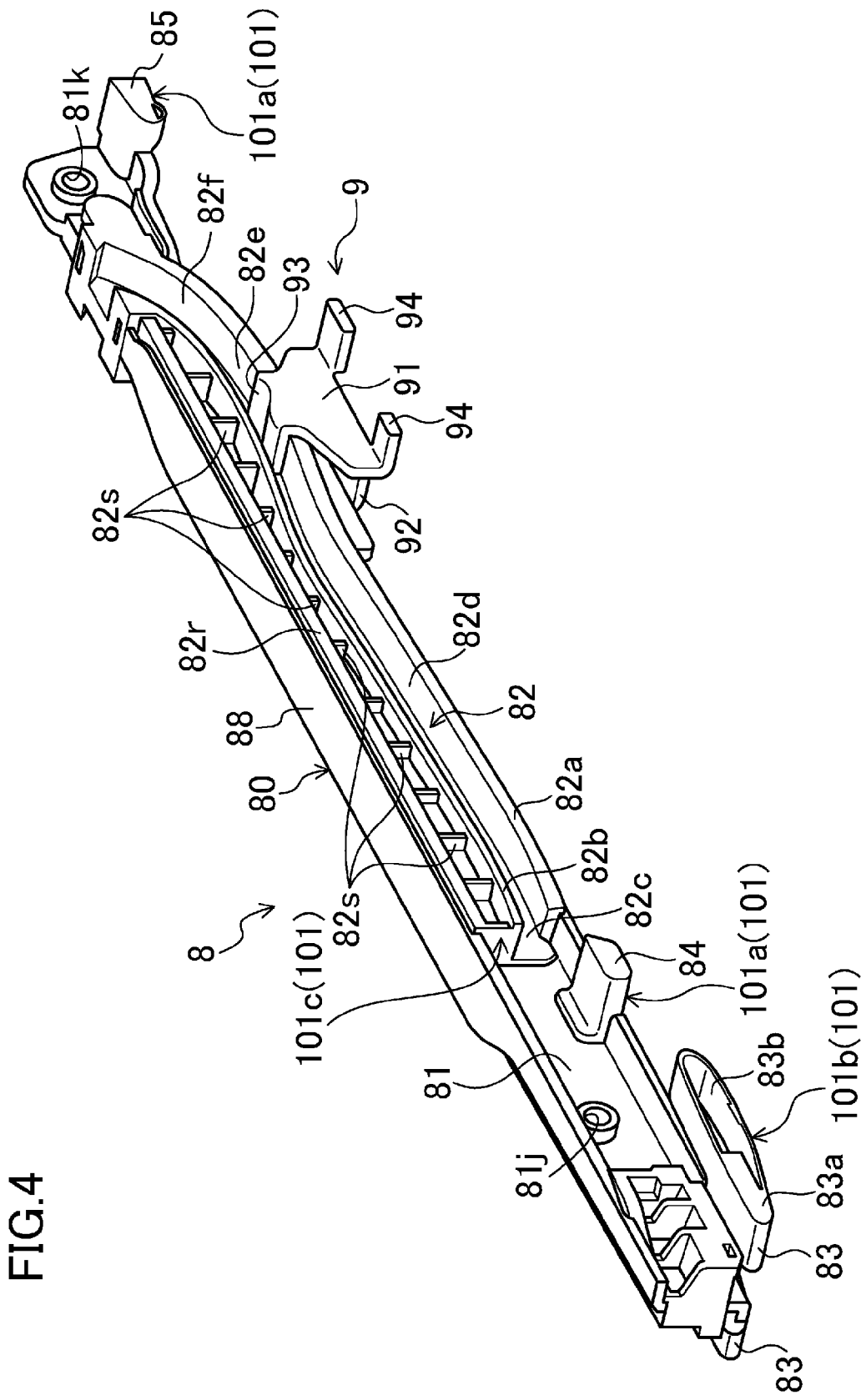
FIG. 4 is an oblique view of a left open/close mechanism.
Figure 5:
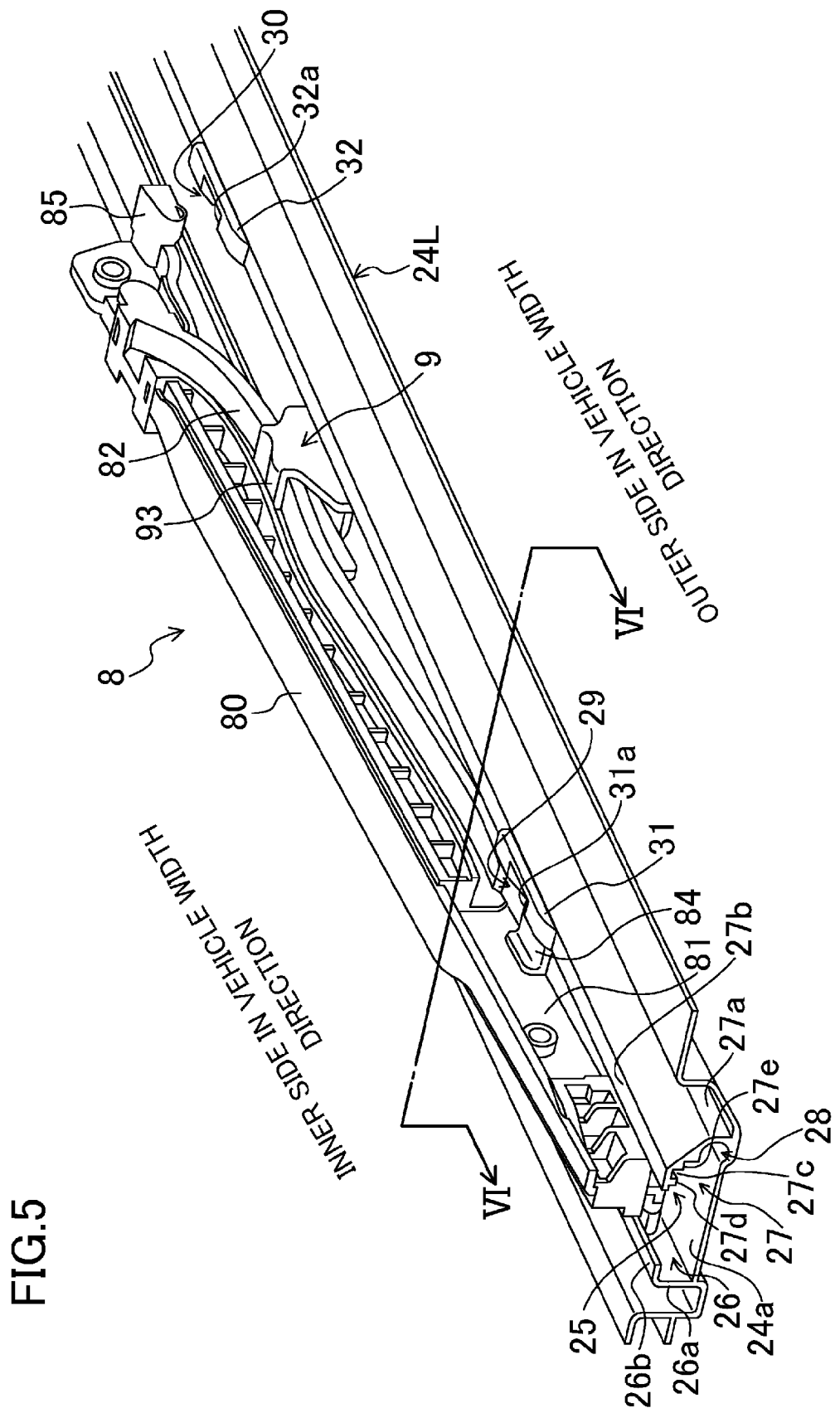
FIG. 5 is an oblique view of the open/close mechanism mounted on a left guide rail.

FIG. 4 is an oblique view of the left open/close mechanism 8. FIG. 5 is an oblique view of the open/close mechanism 8 mounted on the left guide rail 24L. The open/close mechanism 8 includes a panel support member 80 to which the movable panel 5 is attached, and a slider 9 which makes the panel support member 80 move in the front-and-rear direction and tilt in a vertical direction. The panel support member 80 and the slider 9 are supported by the guide rail 24. Structures of the panel support member 80 and the slider 9 will be described in detail later.

Now, a detailed structure of the guide rail 24 will be described. Since the right guide rail 24R and the left guide rail 24L have symmetrical structures, the structure of the left guide rail 24L will be described below.

As shown in FIG. 5, the left guide rail 24L includes a path 25 along which the panel support member 80 moves back and forth, first and second guide grooves 26, 27 located on sides of the path 25, and a cable guide groove 28 in which the push-pull cable 12 (not shown in FIG. 5) is laid. The first guide groove 26 is located on the inner side in the vehicle width direction with respect to the path 25. The second guide groove 27 is located on the outer side in the vehicle width direction with respect to the path 25. The first guide groove 26 is open toward the outer side in the vehicle width direction. The second guide groove 27 is open toward the inner side in the vehicle width direction. That is, the first guide groove 26 and the second guide groove 27 are open toward the path 25, facing each other. The cable guide groove 28 is located on the outer side of the second guide groove 27 in the vehicle width direction, and communicates with the second guide groove 27.

More specifically, the left guide rail 24L includes: a bottom wall 24a extending in the front-and-rear direction in an approximately horizontal state; a first vertical wall 26a provided at an inner side of the bottom wall 24a in the vehicle width direction and rising up from the bottom wall 24a; a first upper wall 26b extending approximately horizontally from an upper end of the first vertical wall 26a toward the outer side in the vehicle width direction; a second vertical wall 27a provided at an outer side of the bottom wall 24a in the vehicle width direction and rising up from the bottom wall 24a; and a second upper wall 27b extending approximately horizontally from an upper end of the second vertical wall 27a toward the inner side in the vehicle width direction. The second vertical wall 27a rises up from the bottom wall 24a and is inclined toward the path 25. Similar to the bottom wall 24a, the first vertical wall 26a, the first upper wall 26b, the second vertical wall 27a, and the second upper wall 27b extend in the front-and-rear direction.

The first guide groove 26 is formed by the bottom wall 24a, the first vertical wall 26a, and the first upper wall 26b. The upper surface of the bottom wall 24a and the lower surface of the first upper wall 26b form a guide surface.

The second guide groove 27 is formed by the bottom wall 24a, the second vertical wall 27a, and the second upper wall 27b. A recessed groove 27c extending in the front-and-rear direction is formed in the lower surface of the second upper wall 27b at an approximately middle portion in the vehicle width direction. The lower surface of the second upper wall 27b is divided into a first guide surface 27d closer to the path 25, and a second guide surface 27e farther from the path 25, by the recessed groove 27c. The distance between the first guide surface 27d and the bottom wall 24a is slightly larger than the distance between the second guide surface 27e and the bottom wall 24a.

A portion of the bottom wall 24a that is adjacent to the area where the second vertical wall 27a is connected is curved downward. The downwardly curved portion of the bottom wall 24a and the second vertical wall 27a form the cable guide groove 28.

Figure 6:
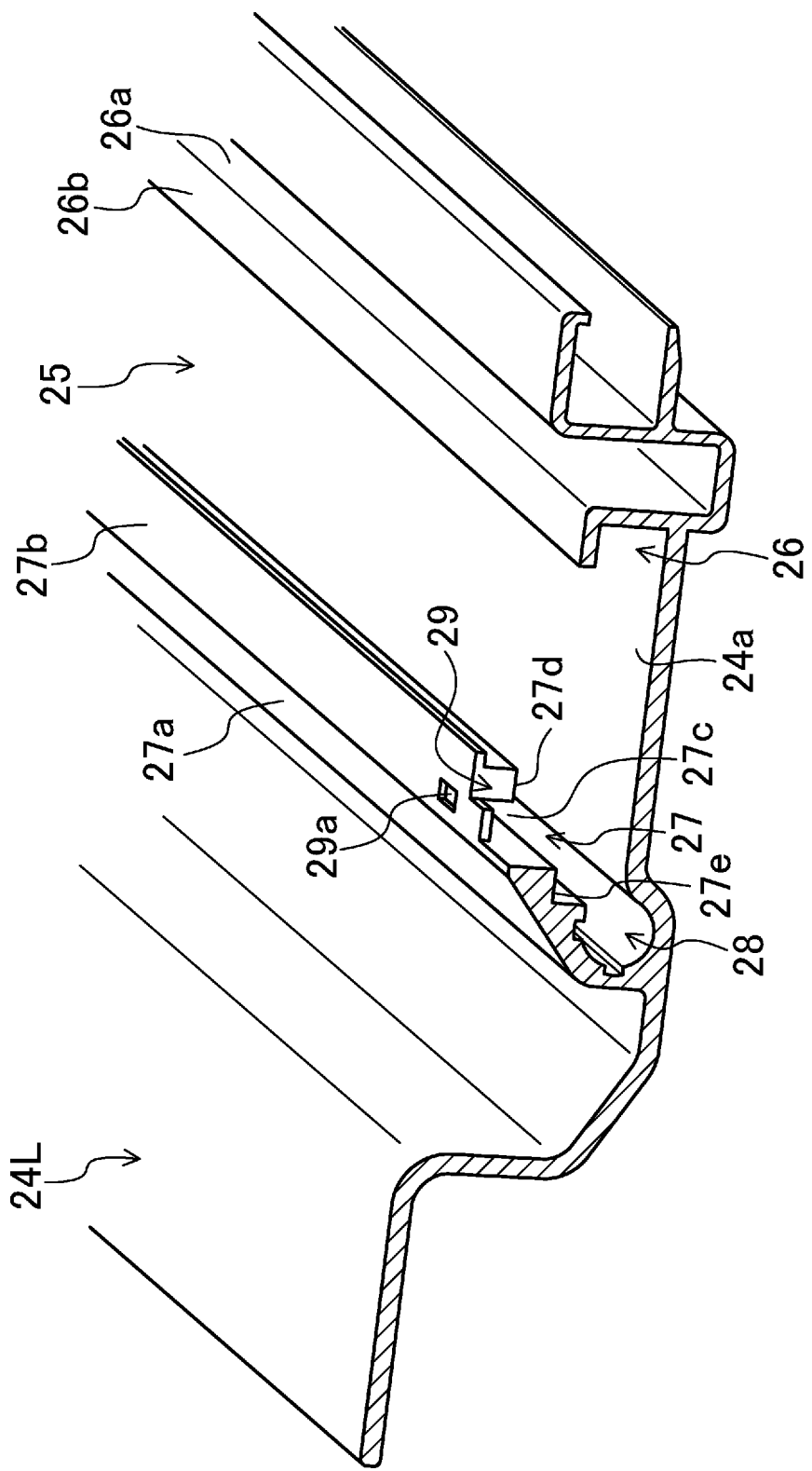
FIG. 6 is an oblique view of the guide rail taken along the line VI-VI in FIG. 5.

First and second notches 29, 30 are formed in the second upper wall 27b. FIG. 6 is an oblique view of the guide rail 24 taken along the line VI-VI of FIG. 5. In FIG. 6, a first guide member 31, which will be described later, is omitted. The first notch 29 is located forward of the second notch 30. The first notch 29 is in an approximately square shape that is notched from the edge of the second upper wall 27b on the path 25 side in a width direction of the second upper wall 27b. More specifically, the first notch 29 reaches the recessed groove 27c in the width direction of the second upper wall 27b. That is, the first guide surface 27d is divided into front and rear surfaces by the first notch 29. Similar to the first notch 29, the second notch 30 is notched from the edge of the second upper wall 27b on the path 25 side in the width direction until it reaches the recessed groove 27c. The first guide surface 27d is divided into front and rear surfaces by the second notch 30, as well. In contrast, the second guide surface 27e is not divided into front and rear surfaces by the first and second notches 29, 30, and forms a continuous surface in the front-and-rear direction.

A first guide member 31 is provided at the first notch 29. The first guide member 31 is provided with a first guide groove 31a which is open toward the path 25 and extending in an approximately vertical direction. The lower end of the first guide groove 31a is open in the second guide groove 27. This opening is formed into a shape that is notched from the edge of the second upper wall 27b on the path 25 side in the width direction of the second upper wall 27b. The opening reaches the recessed groove 27c in the width direction of the second upper wall 27b. Further, a second guide member 32 is provided at the second notch 30. The second guide member 32 is provided with a second guide groove 32a which is open toward the path 25 and is extending in an approximately vertical direction. The lower end of the second guide groove 32a is open in the second guide groove 27. This opening, too, is formed into a shape that is notched from the edge of the second upper wall 27b on the path 25 side in the width direction of the second upper wall 27b, and the opening reaches the recessed groove 27c.

Now, a detailed structure of the open/close mechanism 8 will be described. Since the left and right open/close mechanisms 8, 8 have symmetrical structures, the structure of the left open/close mechanism 8 will be described below.

The panel support member 80 is fixed to the lower surface of the movable panel 5 at each lateral side end of the movable panel 5 in the vehicle width direction. As shown in FIG. 4, the panel support member 80 includes a cored bar 81 which is a bent metal plate, and a resin portion 101 integrally formed on a surface of the cored bar 81. The resin portion 101 is integrally formed on the surface of the cored bar 81 by so-called insert molding in which a resin material is ejected while the cored bar 81 is inserted in a mold. The resin portion 101 is comprised of resin portions 101a which form front and rear side pins 84, 85, a resin portion 101b which forms a shoe 83, and a resin portion 101c which forms a cam groove 82. The cam groove 82 extends in an approximately front-and-rear direction, while curving along a predetermined curve.

Figure 11:
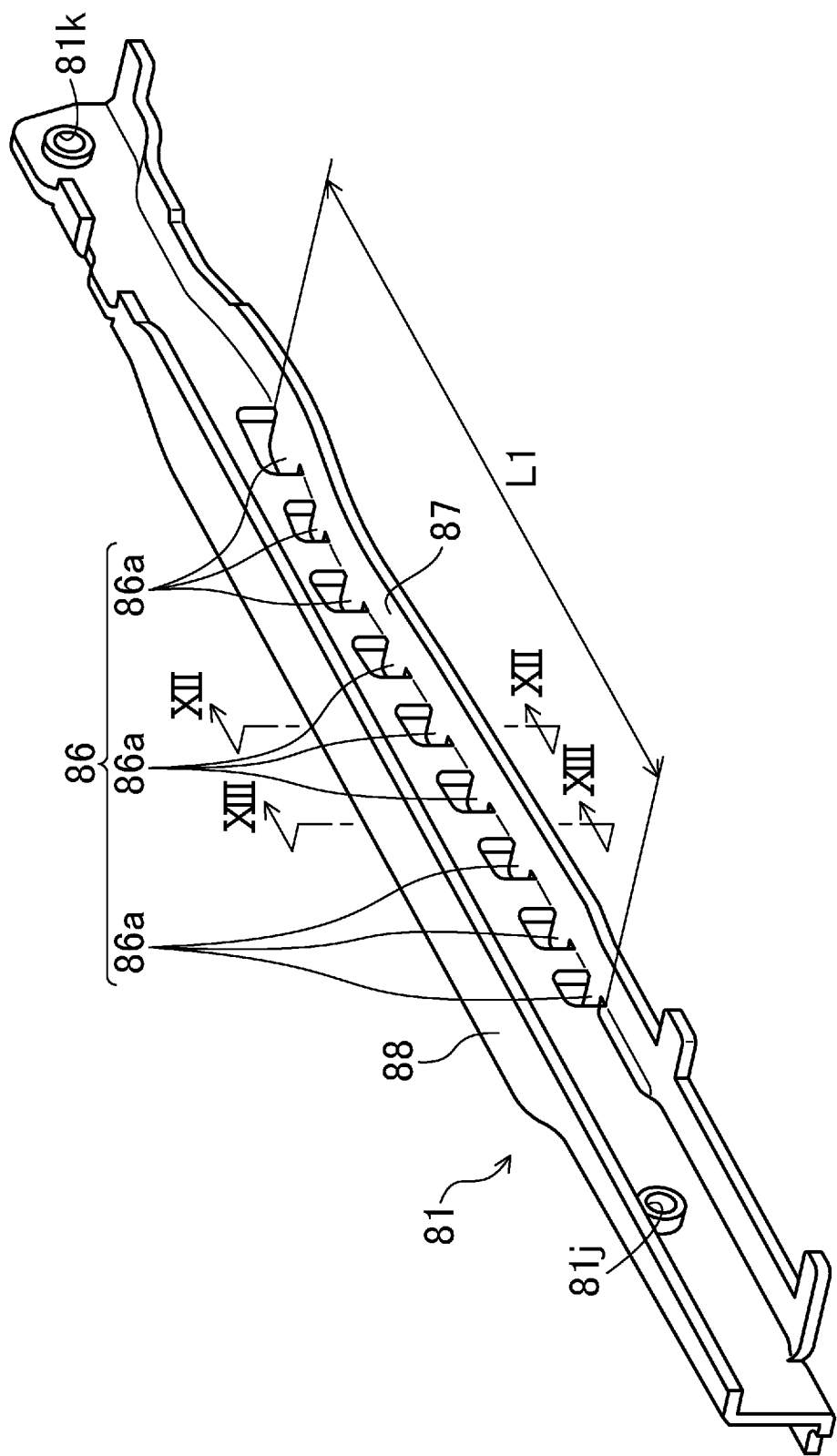
FIG. 11 is an oblique view of a cored bar of a panel support member.
Figure 12:
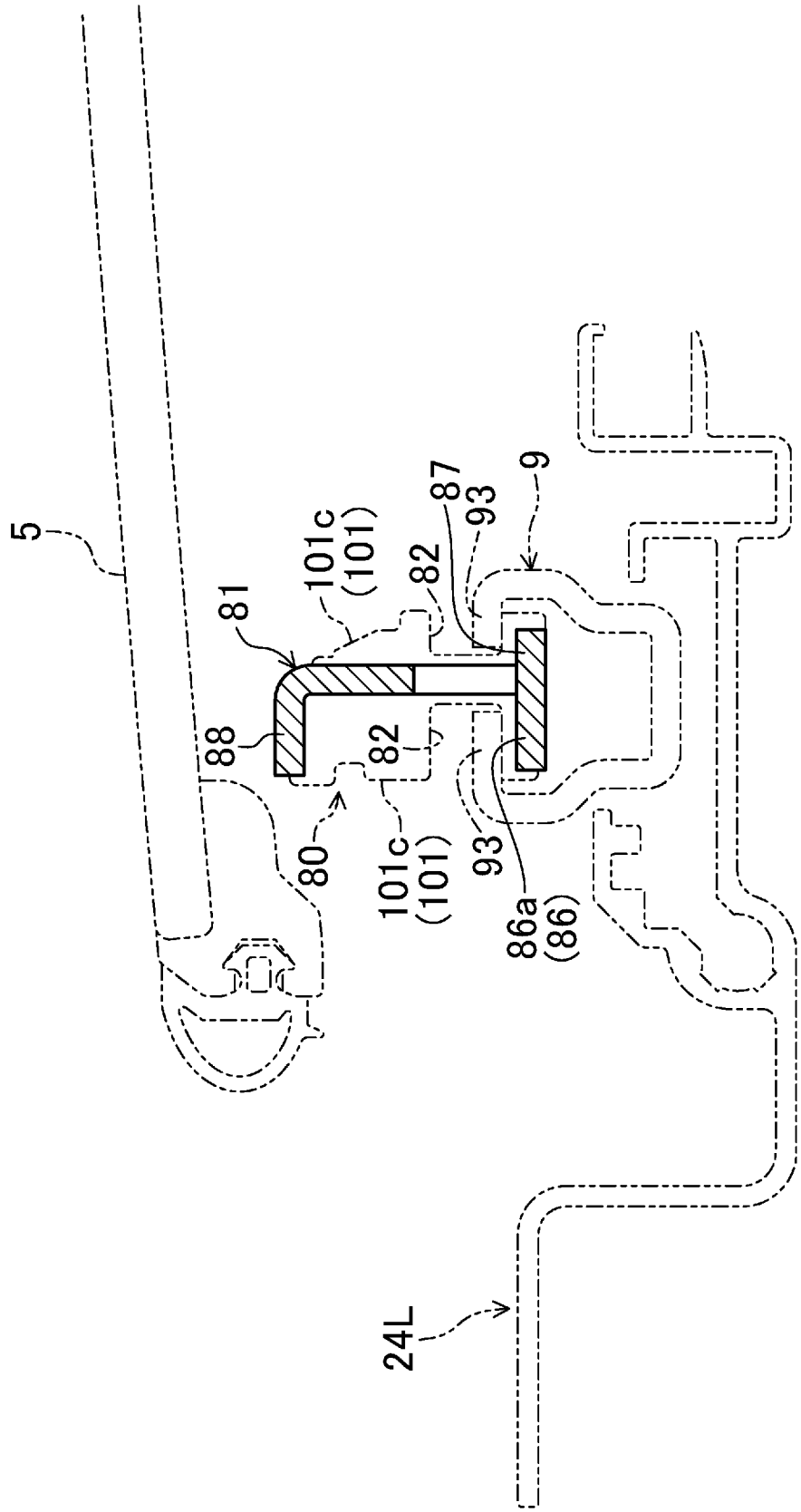
FIG. 12 is a cross section taken along the line XII-XII of FIG. 11.
Figure 13:
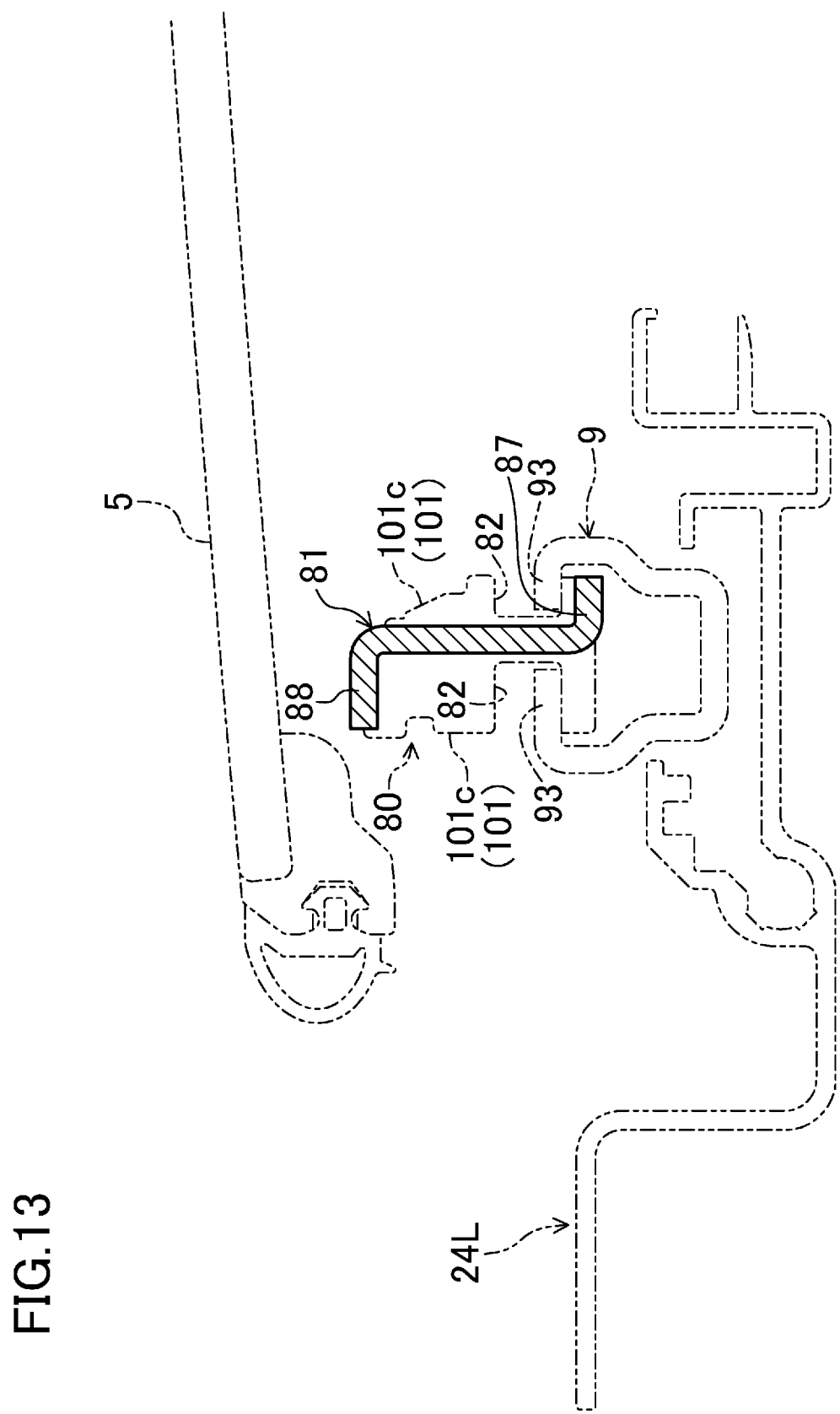
FIG. 13 is a cross section taken along the line XIII-XIII of FIG. 11.

As shown in FIG. 11 to FIG. 13, the cored bar 81 is in an elongated panel-like shape extending in a direction along which the guide rail 24 extends. That is, the cored bar 81 is in a panel-like shape extending in an approximately front-and-rear direction, with its thickness direction aligned with the vehicle width direction, that is, with its width dimension extending upright.

The movable panel 5 is fixed to a front end and a rear end of the cored bar 81 with bolts, with brackets (not shown) interposed therebetween. Bolt through holes 81j, 81k are formed in the front end and the rear end of the cored bar 81, and pass through the cored bar 81 in the thickness direction for insertion of the bolts. The upper end of the cored bar 81 is provided with a flange 88 extending in the direction along which the cored bar 81 extends. The flange 88 serves as a reinforcing part, and also serves as a seat which supports the movable panel 5.

A portion of the bottom end of the cored bar 81 which is located under the cam groove 82 is bent to form first and second protrusions 86, 87 which protrude toward lateral sides of the cored bar 81 in the thickness direction of the cored bar 81. In the present embodiment, the first protrusion 86 protrudes inward in the vehicle width direction, and the second protrusion 87 protrudes outward in the vehicle width direction.

The first protrusion 86 is comprised of a plurality of tongues 86a (nine tongues in the present embodiment) formed by notching multiple parts of the cored bar 81 and bending the notched parts inward in the vehicle width direction. That is, the first protrusion 86 is formed by cutting and bending parts of the cored bar 81 inward in the vehicle width direction. Specifically, each of the tongues 86a is formed by cutting a square U-shaped slit in the cored bar 81 to cut a rectangular piece, with its one side left uncut, and bending the rectangular piece inward in the vehicle width direction from the side that is left uncut. The plurality of tongues 86a are formed within a predetermined length L1 of a middle portion of the cored bar 81 in the front-and-rear direction (the extension direction) and spaced apart from each other in the front-and-rear direction.

On the other hand, the second protrusion 87 is formed into a continuous panel-like shape extending in the direction along which the cored bar 81 extends, by bending the bottom end of the cored bar 81 into an L shape. The second protrusion 87 extends along an approximately entire lower edge of the cored bar 81. A portion of the second protrusion 87 which corresponds to the cam groove 82 forms a panel having the same curved shape as that of the cam groove 82.

As shown in FIG. 4, the resin portion 101c which forms the cam groove 82 includes: a bottom wall 82a extending in a predetermined curve; an upper wall 82b located above the bottom wall 82a and extending approximately in parallel with the bottom wall 82a; a side wall 82c connecting the bottom wall 82a and the upper wall 82b; a flange cover 82r which covers the lower surface of the flange 88 of the cored bar 81; and a plate rib 82s which connects the upper wall 82b and the flange cover 82r. The cam groove 82 is a groove with a square U-shaped cross section formed by the upper wall 82b, the bottom wall 82a, and the side wall 82c. The plate rib 82s includes a plurality of plate ribs 82s spaced apart from each other in the front-and-rear direction.

The cam groove 82 serves as an engagement cam with which an engagement portion 93, described later, of the slider 9 engages. The cam groove 82 includes a tilt region 82d where the engagement portion 93 is located when the movable panel 5 is in the tilted state, a fully-closed region 82e where the engagement portion 93 is located when the movable panel 5 is in the fully-closed state, and a downward movement region 82f where the engagement portion 93 is located when the movable panel 5 is in a downward movement state. The tilt region 82d, the fully-closed region 82e, and the downward movement region 82f are provided sequentially from the front side. The tilt region 82d, the fully-closed region 82e, and the downward movement region 82f have different inclinations. The cam groove 82 is upwardly curved at a portion connecting the tilt region 82d and the fully-closed region 82e, and is downwardly curved at a portion connecting the fully-closed region 82e and the downward movement region 82f.

Right and left shoes 83, 83 are provided at the front end of the cored bar 81. The shoe 83 includes a front end 83a connected to the cored bar 81, and a strip portion 83b which extends from the lower edge of the front end toward the rear and loops back to be connected to the rear edge of the front end. The shoe 83 is in an annular shape as a whole. The shoe 83 is made of resin, and is deformable due to the resin and the annular shape. The two shoes 83, 83 engage with the first and second guide grooves 26, 27 of the guide rail 24. Specifically, the shoe 83 on the inner side in the vehicle width direction with respect to the cored bar 81 engages with the first guide groove 26, and the shoe 83 on the outer side in the vehicle width direction with respect to the cored bar 81 engages with the second guide groove 27.

A front side pin 84 protruding from the cored bar 81 toward the outer side in the vehicle width direction is provided at a portion of the cored bar 81 which is relatively close to the front and on the rear side of the shoes 83, 83. A rear side pin 85 protruding from the cored bar 81 toward the outer side in the vehicle width direction is provided at a rear end of the cored bar 81. The front side pin 84 and the rear side pin 85 engage with the second guide groove 27.

The slider 9 engages with the first and second guide grooves 26, 27 of the guide rail 24, and is movable in the front-and-rear direction along the first and second guide grooves 26, 27. The push-pull cable 12 (not shown in FIGS. 4 and 5) is connected to the slider 9, and the slider 9 is driven by the push-pull cable 12. Further, the slider 9 also engages with the cam groove 82 of the panel support member 80. Specifically, the slider 9 includes: a pair of vertical walls 91 facing each other (only one of the vertical walls 91 is shown in FIG. 4); a connecting wall 92 which connects lower ends of the pair of vertical walls 91; an engagement portion 93 which protrudes from the upper end of each of the vertical walls 91 and extends toward the opposing one of the vertical walls 91; projections 94, 94 which protrude from a front end and a rear end of each of the vertical walls 91 and extend away from the opposing one of the vertical walls 91; and a sliding portion (not shown) provided at each of the projections 94, 94. The slider 9 is formed of resin and a metal plate which are integrally molded by insert molding. The vertical wall 91, the connecting wall 92, the engagement portion 93, and the projections 94, 94 are formed by bending a metal plate. The sliding portion is made of resin. The left and right sliding portions respectively engage with the first and second guide grooves 26, 27 of the guide rail 24. The push-pull cable 12 is integrally formed with the sliding portion on the outer side in the vehicle width direction. The push-pull cable 12 engages with the cable guide groove 28 of the guide rail 24. The engagement portion 93 engages with the cam groove 82 of the panel support member 80.

Now, operation of the movable panel 5 by the open/close mechanism 8 configured as above will be described. In the following description, the operation of the movable panel 5 will be described with reference to engagement relationship between the shoe 83, the front side pin 84 and the rear side pin 85, and the second guide groove 27. The shoe 83 on the inner side in the vehicle width direction always engages with the first guide groove 26, irrespective of the state of the movable panel 5.

Figure 7:
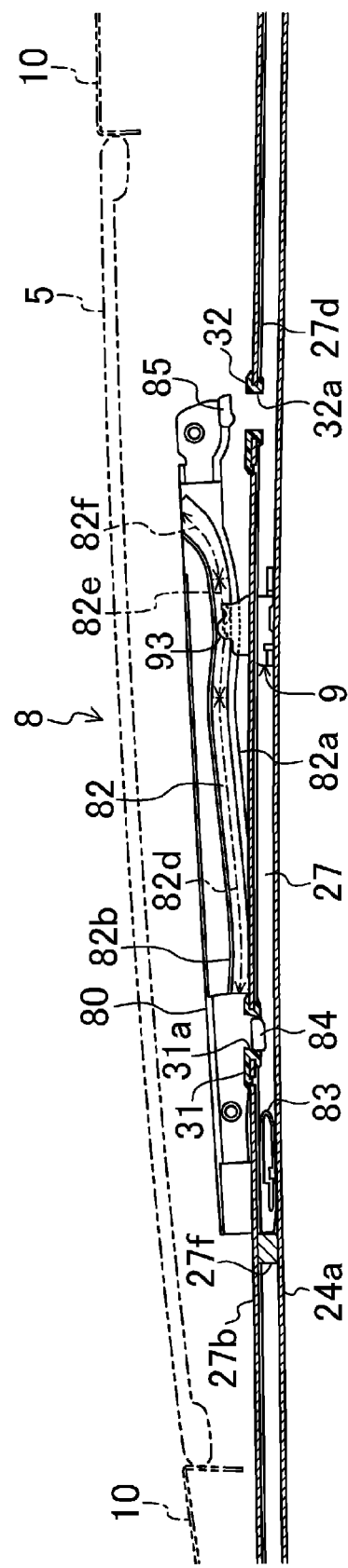
FIG. 7 is a longitudinal cross section of the open/close mechanism in a second guide groove in the fully-closed state.
Figure 8:
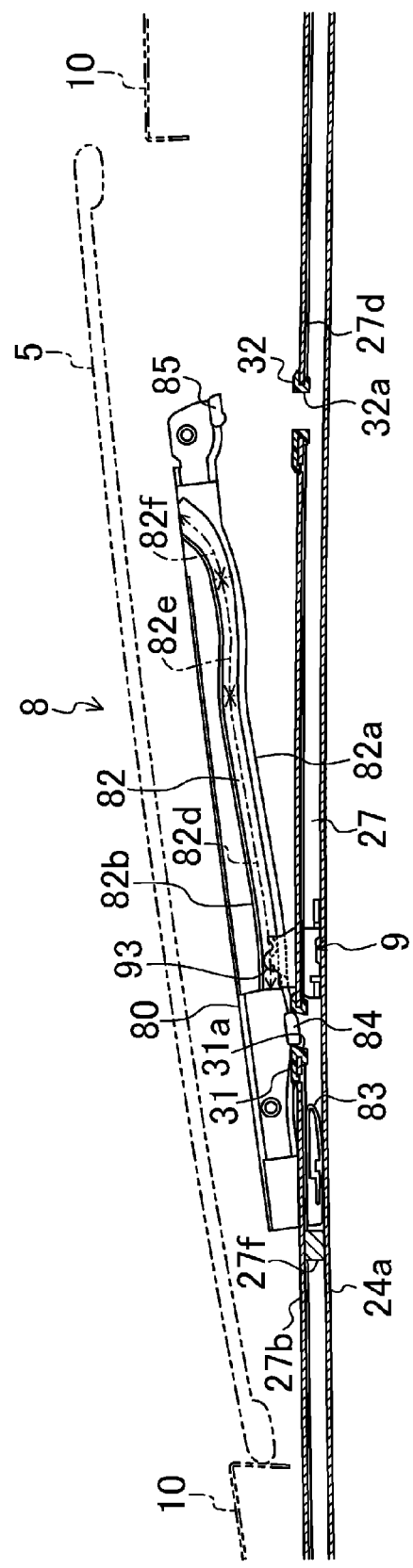
FIG. 8 is a longitudinal cross section of the open/close mechanism in the second guide groove in the tilted state.
Figure 9:
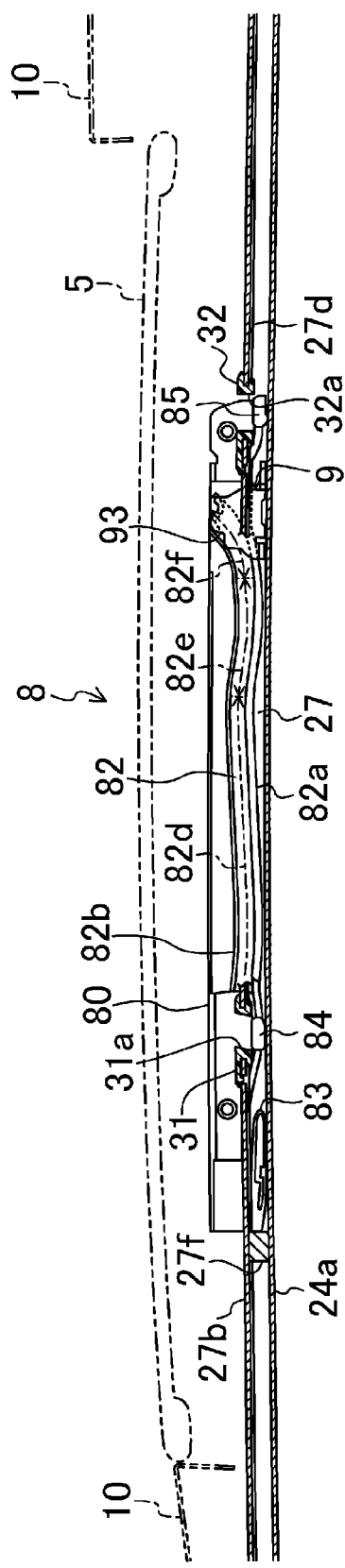
FIG. 9 is a longitudinal cross section of the open/close mechanism in the second guide groove in a downward movement state.
Figure 10:
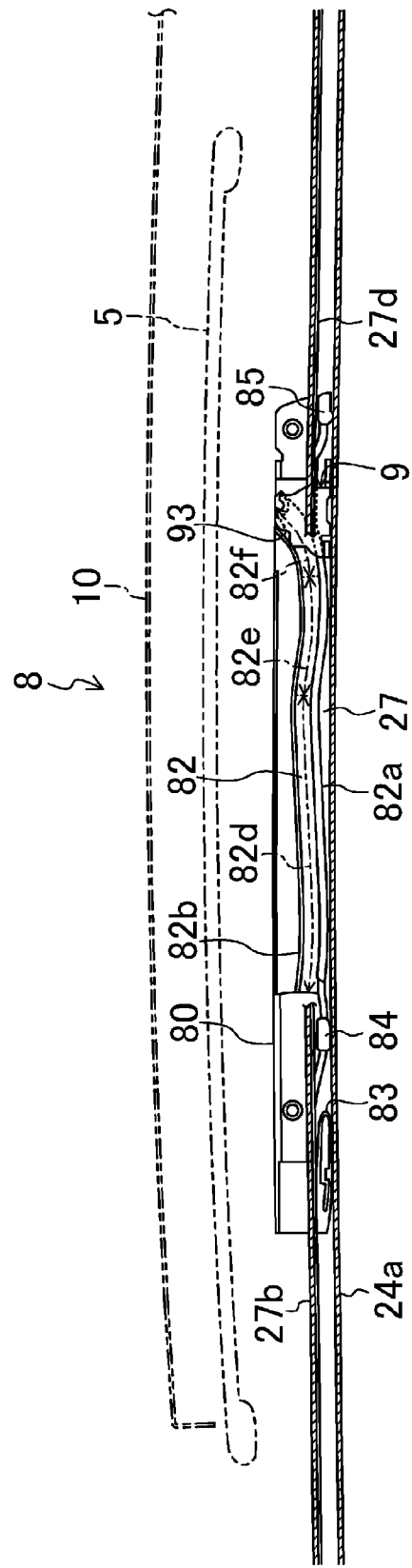
FIG. 10 is a longitudinal cross section of the open/close mechanism in the second guide groove in the fully-opened state.

FIG. 7 is a longitudinal cross section of the open/close mechanism 8 in the second guide groove 27 in the fully-closed state. FIG. 8 is a longitudinal cross section of the open/close mechanism 8 in the second guide groove 27 in the tilted state. FIG. 9 is a longitudinal cross section of the open/close mechanism 8 in the second guide groove 27 in the downward movement state. FIG. 10 is a longitudinal cross section of the open/close mechanism 8 in the fully-opened state.

In the fully-closed state shown in FIG. 7, the engagement portion 93 of the slider 9 is located at the fully-closed region 82e of the cam groove 82. In this state, the shoes 83 (only one of the shoes 83 is shown in FIGS. 7-10) are in contact with a stopper 27f provided at the second guide groove 27, thereby preventing the panel support member 80 from moving forward any further. Further, the locations of the front and rear side pins 84, 85 in the front-and-rear direction coincide with the locations of the first and second guide members 31, 32 in the front-and-rear direction, respectively. The front side pin 84 enters in the first guide groove 31a of the first guide member 31. This also prevents the forward movement of the panel support member 80. In contrast, the rear side pin 85 comes completely out of the second guide groove 27. The movable panel 5 in the fully-closed state is approximately flush with the roof 10.

To tilt the movable panel 5 from the fully-closed state, the slider 9 is moved forward by the push-pull cable 12, using the drive motor 13. As a result, the engagement portion 93 of the slider 9 moves forward within the tilt region 82d of the cam groove 82. Since the tilt region 82d is tilted downward toward the front side, the engagement portion 93 pushes the upper wall 82b of the cam groove 82 forward at this moment. However, the panel support member 80 does not move forward since the forward movement of the panel support member 80 is restricted by the engagement between the front side pin 84 and the first guide member 31. In contrast, the tilting of the panel support member 80 in the vertical direction is not restricted, since the front side pin 84 is in the first guide groove 31a, and the rear side pin 85 comes out of the second guide groove 27 in the upward direction. Thus, the panel support member 80 is tilted such that the rear end thereof is lifted, with the shoe 83 as a fulcrum. Associated with this movement, the movable panel 5 is also tilted such that the rear end thereof is lifted. As shown in FIG. 8, the movable panel 5 is tilted most steeply when the engagement portion 93 reaches the front end of the tilt region 82d. The front side pin 84 does not completely come out of the first guide groove 31a of the first guide member 31 in this state, and the state in which the front side pin 84 engages with the first guide member 31 is maintained.

To move the movable panel 5 from the tilted state to the fully-closed state, the slider 9 is moved backward by the push-pull cable 12, using the drive motor 13. As a result, the engagement portion 93 of the slider 9 moves backward within the tilt region 82d of the cam groove 82. Since the tilt region 82d is tilted downward toward the front side, the engagement portion 93 pushes the bottom wall 82a of the cam groove 82 backward at this moment. However, the panel support member 80 does not move backward since the backward movement of the panel support member 80 is restricted by the engagement between the front side pin 84 and the first guide member 31. In contrast, the tilting of the panel support member 80 in the vertical direction is not restricted, since the front side pin 84 is in the first guide groove 31a, and the rear side pin 85 comes out of the second guide groove 27 in the upward direction. Thus, the panel support member 80 is tilted such that the rear end thereof is moved downward, with the shoe 83 as a fulcrum. Associated with this movement, the movable panel 5 is also tilted such that the rear end thereof is moved downward. The movable panel 5 is in the fully-closed state when the engagement portion 93 reaches the fully-closed region 82e. The front side pin 84 does not completely come out of the first guide groove 31a of the first guide member 31 in this state, and the state in which the front side pin 84 engages with the first guide member 31 is maintained. The rear side pin 85 is still in the state of being out of the second guide groove 27 in the upward direction.

To move the movable panel 5 from the fully-closed state to the open state, the movable panel 5 is moved to the downward movement state, and thereafter the movable panel 5 is moved backward.

To move the movable panel 5 from the fully-closed state to the downward movement state, the slider 9 is moved backward by the push-pull cable 12, using the drive motor 13. As a result, the engagement portion 93 of the slider 9 moves backward within the downward movement region 82*f* of the cam groove 82. Since the downward movement region 82*f* is tilted downward toward the front side, the engagement portion 93 pushes the bottom wall 82*a* of the cam groove 82 backward at this moment. However, the panel support member 80 does not move backward since the backward movement of the panel support member 80 is restricted by the engagement between the front side pin 84 and the first guide member 31. In contrast, the tilting of the panel support member 80 in the vertical direction is not restricted, since the front side pin 84 is in the first guide groove 31*a*, and the rear side pin 85 comes out of the second guide groove 27 in the upward direction. Thus, the panel support member 80 is tilted such that the rear end thereof is moved downward, with the shoe 83 as a fulcrum. Associated with this movement, the movable panel 5 is also tilted such that the rear end thereof is moved downward. At this moment, the front side pin 84 comes out of the first guide groove 31*a* of the first guide member 31 in the downward direction, and enters in the second guide groove 27. Further, the rear side pin 85 passes through the second guide groove 32*a* of the second guide member 32, and enters in the second guide groove 27. As shown in FIG. 9, the movable panel 5 is in the downward movement state, i.e., at the lowest position, when the front and rear side pins 84, 85 are in contact with the bottom wall 24*a* in the second guide groove 27. In the downward movement state, the movable panel 5 is at a position lower than the roof 10.

When the slider 9 is moved further backward from the downward movement state, the movable panel 5 moves backward, and the opening 11 gradually opens. Specifically, in the downward movement state, the engagement portion 93 pushes the bottom wall 82*a* of the cam groove 82 backward since the downward movement region 82*f* is tilted downward toward the front side. However, the panel support member 80 cannot go down any further in a tilted manner since the front and rear side pins 84, 85 are in contact with the bottom wall 24*a* in the second guide groove 27. In contrast, the backward movement of the front and rear side pins 84, 85 is not restricted, since the front and rear side pins 84, 85 are in the second guide groove 27, and are not engaged with the first and second guide members 31, 32. Thus, the panel support member 80 moves backward along the second guide groove 27. Associated with this movement, the movable panel 5 also moves backward. The movable panel 5 having moved backward is drawn in a space under the roof 10. In the fully-opened state, approximately the entire movable panel 5 is located under the roof 10. The front and rear side pins 84, 85 are engaged with the second guide groove 27 also during a time when the panel support member 80 moves backward. Thus, the vertical movements of the panel support member 80 and of the movable panel 5 are restricted.

To move the movable panel 5 from the fully-opened state to the fully-closed state, the movable panel 5 is moved forward to the downward movement state, and thereafter, the movable panel 5 is tilted upward. Specifically, the slider 9 is moved forward by the push-pull cable 12, using the drive motor 13. In the fully-opened state, the engagement portion 93 pushes the upper wall 82*b* of the cam groove 82 forward since the downward movement region 82*f* is tilted downward toward the front side. However, the panel support member 80 cannot go up any further in a tilted manner since the front and rear side pins 84, 85 are in contact with the first guide surface 27*d* in the second guide groove 27. In contrast, the forward movement of the front and rear side pins 84, 85 is not restricted, since the front and rear side pins 84, 85 are located in the second guide groove 27, and are not engaged with the first and second guide members 31, 32. Thus, the panel support member 80 moves forward along the second guide groove 27. Associated with this movement, the movable panel 5 also moves forward.

Soon, the shoe 83 comes in contact with the stopper 27*f* provided at the second guide groove 27, and the forward movement of the panel support member 80 is restricted. In this state, the front side pin 84 is located under the first guide groove 31*a* of the first guide member 31, and the rear side pin 85 is located under the second guide groove 32*a* of the second guide member 32. That is, the upward movement of the front and rear side pins 84, 85 is not restricted by the first guide surface 27*d* of the second guide groove 27. Thus, from this point, the engagement portion 93 starts to move forward in the downward movement region 82*f*, and associated with this movement, the panel support member 80 is tilted by the engagement portion 93 such that the rear end of the panel support member 80 is lifted. At this moment, the front side pin 84 enters in the first guide groove 31*a* of the first guide member 31, and the rear side pin 85 enters in the second guide groove 32*a* of the second guide member 32. After that, when the engagement portion 93 reaches the fully-closed region 82*e*, the movable panel 5 becomes the fully-closed state. In the fully-closed state, the front side pin 84 is in the first guide groove 31*a* of the first guide member 31, and the rear side pin 85 comes out of the second guide groove 32*a* of the second guide member 32 in the upward direction.

As described above, the state of the movable panel 5 is changed by moving the panel support member 80 in the front-and-rear direction along the path 25 of the guide rail 24, and by tilting the panel support member 80 in the up-and-down direction, with the shoe 83 as a fulcrum. The shoes 83, 83 are always engaged with the first and second guide grooves 26, 27, whereas the front and rear side pins 84, 85 are engaged with the second guide groove 27 only when the panel support member 80 is moved in the front-and-rear direction, and come out of the second guide groove 27 when the panel support member 80 is tilted in the vertical direction.

In the sunroof device 100 having the above structure, when an excess upthrust load caused by the traveling wind or by a load applied from a person is applied to the movable panel 5 in the tilted state, the resin portion 101*c* of the panel support member 80 may be damaged, and the panel support member 80 may be thrust up together with the movable panel 5 and disengaged from the engagement portion 93 of the slider 9.

To avoid this, in the first embodiment, the first and second protrusions 86, 87 which protrude toward lateral sides of the cored bar 81 in the thickness direction are provided at the cored bar 81 under the cam groove 82 (see FIG. 4 and FIG. 11 to FIG. 13).

Thus, even when the resin portion 101*c* of the panel support member 80 is damaged and the panel support member 80 is caused to move upward, the first and second protrusions 86, 87 provided at the cored bar 81 are caught at the engagement portion 93 of the slider 9, and the panel support member 80 is prevented from being disengaged upward from the engagement portion 93 of the slider 9. As a result, the detachment of the movable panel 5 can be reliably prevented. Moreover, since the engagement portion 93 of the slider 9 is formed of a bent metal plate, the engagement portion 93 is stronger than the engagement portion 93 formed of a resin material. Thus, when the first and second protrusions 86, 87 of the cored bar 81 are caught at the engagement portion 93, damage of the engagement portion 93 can be reliably prevented, and as a result, the disengagement of the panel support member 80 from the engagement portion 93 of the slider 9 can be more reliably prevented.

In the above embodiment, the second protrusion 87 is formed into a continuous panel-like shape extending in the direction along which the cored bar 81 extends, by bending the bottom end of the cored bar 81 into an L shape, and the first protrusion 86 includes a plurality of tongues 86a formed by notching multiple parts of the cored bar 81 and bending the notched parts.

Thus, it is not necessary to combine two cored bars 81, and the protrusions 86, 87 can be easily formed at both sides of a single cored bar 81 in the thickness direction of the cored bar 81, in a variety of positions. For example, it is necessary to combine two cored bars 81 in the thickness direction thereof, as shown in Japanese Unexamined Patent Publication No. 2000-313235 (Patent Document 2) if the protrusions 86, 87 are formed at both lateral sides in the thickness direction thereof by bending the bottom end of the cored bar 81 into an L shape. In contrast, in the first embodiment, the first protrusion 86 are comprised of the tongues 86a each formed by cutting and bending parts of the cored bar 81. Thus, as shown in FIG. 12, the first protrusion 86 and the second protrusion 87 can be formed at the lateral sides of a single cored bar 81 in the thickness direction of the cored bar 81. As a result, it is possible to easily form the protrusions 86, 87 at both sides of the cored bar 81 in the thickness direction of the cored bar 81, in a variety of positions, while reducing the thickness and the weight of the panel support member 80.

Further, in the first embodiment, only one of the protrusions 86, 87 (i.e., the first protrusion 86) is formed by notching parts of the cored bar 81 into tongues, and the other (i.e., the second protrusion 87) is formed by bending the bottom end of the cored bar 81 into an L shape. Thus, compared to the case where both of the first and second protrusions 86, 87 are formed by notching parts of the cored bar 81, the number of notches necessary to form the tongues 86a can be reduced. As a result, the first and second protrusions 86, 87 can be formed while sufficiently ensuring the stiffness of the cored bar 81.

Second Embodiment

Figure 14:
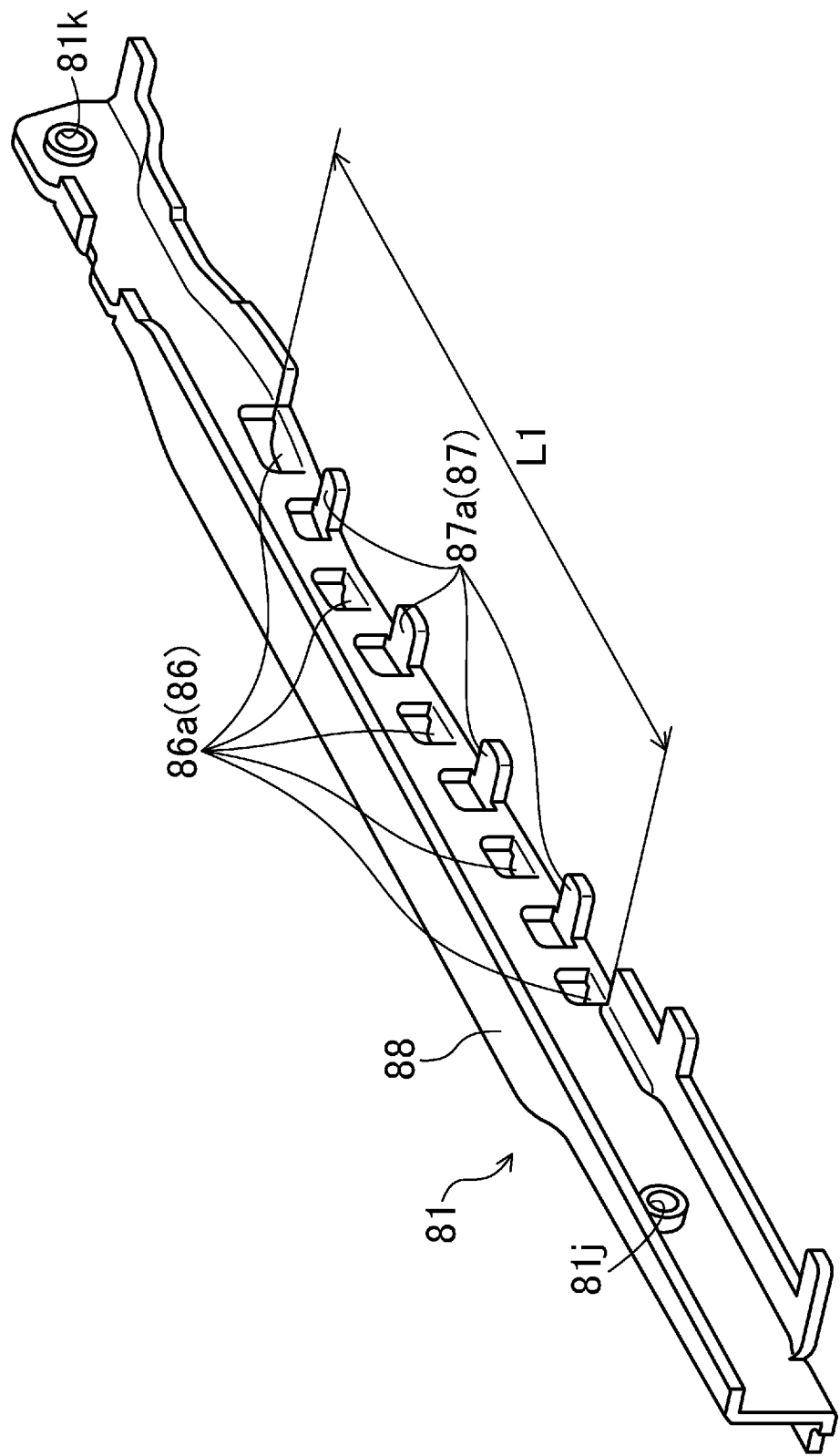
FIG. 14 shows the second embodiment and corresponds to FIG. 11.

FIG. 14 shows the second embodiment in which the structure of the cored bar 81 of the panel support member 80 differs from that of the first embodiment. Like reference characters have been used to designate substantially the same elements as those in FIG. 11, and explanation thereof is appropriately omitted.

Specifically, in the present embodiment, both of the first protrusion 86 and the second protrusion 87 are formed by notching parts of the cored bar 81 and bending the notched parts. The first protrusion 86 includes a plurality of tongues 86a. Similarly, the second protrusion 87 includes a plurality of tongues 87a. The plurality of tongues 86a forming the first protrusion 86, and the plurality of tongues 87a forming the second protrusion 87 are arranged alternately in a staggered manner in the front-and-rear direction. Thus, the first protrusion 86 and the second protrusion 87 can be positioned equally and closely on both sides of the cored bar 81 in the thickness direction of the cored bar 81. In this structure, when the resin portion 101c of the panel support member 80 is damaged and the cored bar 81 is caused to move upward, the protrusions 86, 87 on both sides of the cored bar 81 are easily caught at the engagement portion 93 of the slider 9. As a result, it is possible to reliably prevent the detachment of the panel support member 80 from the engagement portion 93 of the slider 9 in an upward direction.

Further, since not only the first protrusion 86, but also the second protrusion 87 are comprised of the tongues 87a, it is possible to reduce the amount of use of the cored bar 81, compared to the first embodiment. Thus, the protrusions 86, 87 can be formed on both sides of the cored bar 81 in the thickness direction of the cored bar 81, while reducing the weight and cost of the panel support member 80.

Other Embodiments

The structures of the present invention are not limited to the above embodiments, and include various other structures. Specifically, the tongues 86a, 87a are approximately rectangular in the above embodiments, but they are not limited to the rectangular shapes, and may be in a triangular plate-like shape, or in a semicircular plate-like shape, for example.

In the above embodiments, an example in which the extension direction of the guide rail 24 corresponds to the vehicle's front-and-rear direction has been described, but the structure is not limited to the structure described in the embodiments. For example, the extension direction of the guide rail 24 may correspond to the vehicle's width direction.

In the above embodiments, an example in which the engagement cam of the panel support member 80 is a cam groove 82, and the engagement portion 93 of the slider 9 is a protrusion, has been described, but the structure is not limited to the structure described in the embodiments. For example, the engagement cam may be a cam plate extending in an approximately front-and-rear direction, and the engagement portion 93 of the slider 9 may be an engagement groove that engages with the cam plate. Further, the engagement portion 93 may be a cam follower.

In the second embodiment, an example in which the tongues 86a forming the first protrusion 86 and the tongues 87a forming the second protrusion 87 are arranged alternately in a staggered manner in the front-and-rear direction, has been described, but the structure is not limited to the structure described in the embodiment. For example, the tongues 86a (or the tongues 87a) may be arranged with two or three tongues 87a (or tongues 86a) between the tongues 86a (or the tongues 87a).

INDUSTRIAL APPLICABILITY

The present invention is useful for a vehicle's sunroof device in which a movable panel is capable of being moved in a tilted manner, and is especially useful for a vehicle's sunroof device used in a strong wind area, etc.

DESCRIPTION OF REFERENCE CHARACTERS 10 roof (fixed roof)
80 panel support member 81 cored bar
82 cam groove (engagement cam)
86 first protrusion
86a tongue
87 second protrusion
87a tongue
93 engagement portion
100 sunroof device
101c resin portion

The invention claimed is:

1. A sunroof device, comprising:
a movable panel for opening and closing an opening which is formed in a fixed roof of a vehicle and has a predetermined width;
a pair of guide rails fixed to the fixed roof and extending along side edges of the opening in a direction of the width;
a pair of sliders each of which is connected to a corresponding one of the pair of guide rails and is slidable on the guide rail; and
a pair of panel support members each having engagement cams which engage with an engagement portion provided to a corresponding one of the sliders, and each being fixed to a lower surface of the movable panel, wherein
the movable panel is capable of being moved in a tilted manner via the panel support members by allowing the sliders to move along the guide rails,
each of the panel support members includes an elongated panel-like cored bar which extends along the lower surface of the movable panel in a direction along which the guide rails extend, and a resin portion integrally formed with the cored bar and having the engagement cams on both lateral sides of the cored bar in a thickness direction of the cored bar,
a portion of the cored bar which is located under the engagement cams is bent to form first and second protrusions which protrude toward the lateral sides of the cored bar in the thickness direction of the cored bar, and
at least one of the first and second protrusions is formed by notching part of the cored bar into a tongue and bending the notched part.

2. The sunroof device of claim 1, wherein
the first protrusion includes a plurality of tongues formed by notching multiple parts of the cored bar and bending the notched parts, and the tongues are aligned and spaced from one another in the direction along which the cored bar extends, and
the second protrusion is formed into a continuous panel-like shape extending in the direction along which the cored bar extends, by bending a bottom end of the cored bar into an L shape.

3. The sunroof device of claim 1, wherein
each of the first and second protrusions includes a plurality of tongues formed by notching multiple parts of the cored bar and bending the notched parts, and the tongues are aligned and spaced from one another in the direction along which the cored bar extends.

4. The sunroof device of claim 3, wherein
the tongues of the first protrusion and the tongues of the second protrusion are arranged alternately in a staggered manner in the direction along which the cored bar extends.

* * * * *